(12) United States Patent
Merdan et al.

(10) Patent No.: US 8,816,244 B2
(45) Date of Patent: Aug. 26, 2014

(54) INVERTED STENT CUTTING PROCESS

(75) Inventors: Kenneth Merdan, Greenfield, MN (US); Matt Shedlov, Rockford, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1172 days.

(21) Appl. No.: 10/822,883

(22) Filed: Apr. 13, 2004

(65) Prior Publication Data

US 2005/0224473 A1  Oct. 13, 2005

(51) Int. Cl.
*B23K 26/14* (2014.01)
*B23K 26/16* (2006.01)

(52) U.S. Cl.
USPC ............ 219/121.67; 219/121.68; 219/121.69; 219/121.82; 219/121.84

(58) Field of Classification Search
USPC ............. 219/121.67, 121.68, 121.69, 121.82, 219/121.84
See application file for complete search history.

(56) References Cited

U.S. PATENT DOCUMENTS

| | | | |
|---|---|---|---|
| 3,619,550 A | 11/1971 | Matthews | |
| 4,039,799 A | 8/1977 | Stumpf | |
| 4,623,776 A | 11/1986 | Buchroeder et al. | |
| 5,073,694 A * | 12/1991 | Tessier et al. | 219/121.7 |
| 5,339,380 A | 8/1994 | Wysocki et al. | |
| 5,345,057 A | 9/1994 | Muller | |
| 5,500,503 A | 3/1996 | Pernicka et al. | |
| 5,645,740 A | 7/1997 | Naiman et al. | |
| 5,656,186 A | 8/1997 | Mourou et al. | |
| 5,780,807 A | 7/1998 | Saunders | |
| 5,843,117 A | 12/1998 | Alt et al. | |
| 5,852,277 A | 12/1998 | Gustafson | |
| 5,855,802 A * | 1/1999 | Acciai et al. | 216/8 |
| 5,902,499 A | 5/1999 | Richerzhagen | |
| 5,994,667 A * | 11/1999 | Merdan et al. | 219/121.67 |
| 6,034,349 A | 3/2000 | Ota | |
| 6,086,204 A * | 7/2000 | Magnante | 351/212 |
| 6,114,653 A | 9/2000 | Gustafson | |
| 6,131,266 A * | 10/2000 | Saunders | 29/557 |
| 6,160,240 A | 12/2000 | Momma et al. | |
| 6,197,047 B1 * | 3/2001 | Kranz | 623/1.15 |
| 6,316,743 B1 | 11/2001 | Nagahori et al. | |
| 6,327,772 B1 | 12/2001 | Zadno-Azizi et al. | |
| 6,365,871 B1 | 4/2002 | Knowles et al. | |
| 6,369,355 B1 | 4/2002 | Saunders | |
| 6,464,723 B1 * | 10/2002 | Callol | 623/1.34 |
| 6,471,721 B1 | 10/2002 | Dang | |
| 6,517,888 B1 | 2/2003 | Weber | |
| 6,521,865 B1 * | 2/2003 | Jones et al. | 219/121.72 |
| 6,563,080 B2 | 5/2003 | Shapovalov et al. | |
| 6,572,647 B1 | 6/2003 | Supper et al. | |
| 6,612,012 B2 | 9/2003 | Mitelberg et al. | |

(Continued)

FOREIGN PATENT DOCUMENTS

| | | |
|---|---|---|
| JP | 52069091 | 6/1977 |
| JP | 05034934 | 2/1993 |

*Primary Examiner* — Alexandra Elve
(74) *Attorney, Agent, or Firm* — Seager, Tufte & Wickhem LLC

(57) ABSTRACT

A stent manufacturing device and methods for making intravascular stents and other medical devices. The stent manufacturing device may include a base, a laser or other cutting device coupled to the base, a horizontal motor coupled to the base, and a rotary motor coupled to the horizontal motor. A workpiece can be attached to the cutting device, for example adjacent the rotary motor, and the workpiece can be cut with the cutting device.

14 Claims, 3 Drawing Sheets

(56) References Cited

U.S. PATENT DOCUMENTS

| | | | |
|---|---|---|---|
| 6,695,520 B1 * | 2/2004 | Sarno et al. | 403/11 |
| 6,696,667 B1 * | 2/2004 | Flanagan | 219/121.72 |
| 6,874,789 B2 * | 4/2005 | Shedlov | 279/4.09 |
| 2002/0017503 A1 * | 2/2002 | Banas et al. | 219/69.11 |
| 2002/0108937 A1 | 8/2002 | Shapovalov et al. | |
| 2003/0176914 A1 | 9/2003 | Rabkin et al. | |
| 2003/0195613 A1 | 10/2003 | Curcio et al. | |
| 2003/0234243 A1 * | 12/2003 | McCoy | 219/121.72 |

* cited by examiner

INVERTED STENT CUTTING PROCESS

FIELD OF THE INVENTION

The present invention pertains to intravascular stents and other tubular medical devices. More particularly, the present invention pertains to methods and device for manufacturing stents and other tubular medical devices.

BACKGROUND OF THE INVENTION

A wide variety of stents have been developed. In addition, a wide variety of devices and methods for manufacturing stents and other medical devices have been developed. Among these known devices and methods, each has certain advantages and disadvantages. There is an ongoing need to provide alternative devices and methods for making stents and other medical devices.

SUMMARY OF THE INVENTION

The invention provides design, material, and manufacturing method alternatives for stents and medical device manufacturing devices. In at least some embodiments, a stent manufacturing device may include a base, a laser or other cutting device coupled to the base, a horizontal motor coupled to the base, and a rotary motor coupled to the horizontal motor. A workpiece can be attached to the cutting device, for example adjacent the rotary motor, and the workpiece can be cut with the cutting device. These and some of the other features and characteristics of example embodiments are described in more detail below.

DETAILED DESCRIPTION

Figure 1:
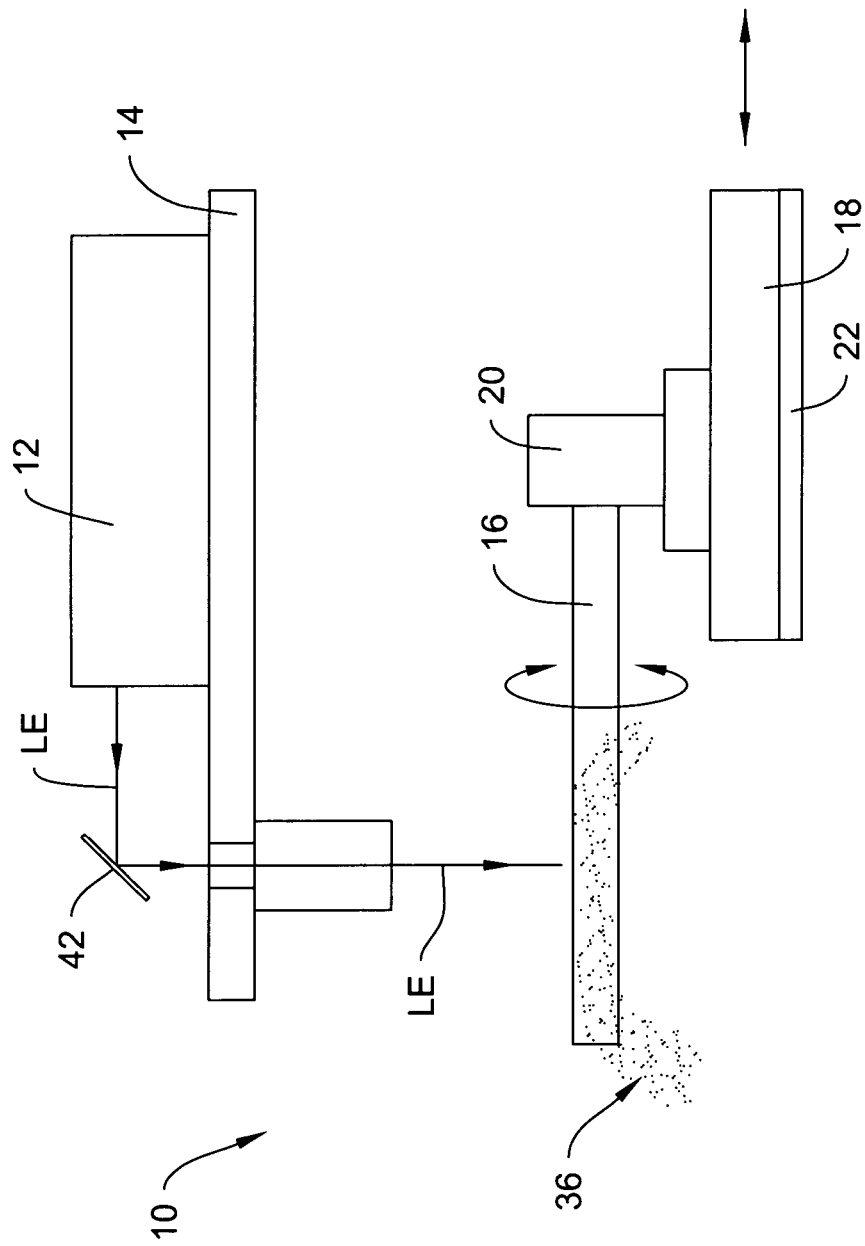
FIG. 1 is a side view of an example stent cutting device.

The following description should be read with reference to the drawings wherein like reference numerals indicate like elements throughout the several views. The detailed description and drawings illustrate example embodiments of the claimed invention.

FIG. 1 is a side view of an example stent cutting device 10 that is similar to those typically used and known in the art. Cutting device 10 includes a laser 12 attached to a first base 14. A tubular workpiece 16 is positioned below laser 12 and is attached to a linear motor 18 and a rotary motor 20. Linear motor 18 and/or rotary motor 20 are attached to a second base 22 that is separate from first base 14. In some embodiments, linear motor 18 and/or rotary motor 20 are direct-drive motors that directly manipulate workpiece 16. In other embodiments, linear motor 18 and/or rotary motor 20 may indirectly move workpiece 16, for example, through the use of a drive belt or other device. Second base 22 is positioned below laser 12 and generally below first base 14. To cut a stent, laser energy LE is transmitted from laser 12 onto workpiece 16 (e.g., directly onto workpiece 16 or reflected onto workpiece 16 by a tuning mirror 42 or series of tuning mirrors 42) so that a number of cuts can be made in workpiece 16. The shape and pattern of the cuts can be manipulated by longitudinally moving workpiece 16 with linear motor 18 (as indicated by the left/right arrow adjacent linear motor 18) and/or rotating workpiece 16 with rotary motor 20 (as indicated by the rotary arrow adjacent rotary motor 20). A fluid media 36 may be passed through or onto workpiece 20 during the cutting procedure for the purposes of washing away debris generated by cutting, cooling, and to prevent laser 12 from cutting through both walls of the tubular workpiece 16.

Because of the minute size of stents and the cut patterns within the stents, it can be appreciated that great precision is required when using cutting device 10. For example, the orientation of laser 12 (and one or more tuning mirrors 42) relative to workpiece 16 must be precisely aligned. Moreover, movement of workpiece 16 with linear motor 18, rotary motor 20, or other motion devices requires precise and accurate movement. Because of this, linear motor 18 and rotary motor 20 are highly tuned and highly aligned so as to provide the level of precision and accuracy called for. This level of precision generally causes devices like device 10 to be expensive due to the cost of purchasing (or building) and maintaining these machines.

As it can be seen in FIG. 1, linear motor 18 and rotary motor 20 are generally positioned below workpiece 16 and/or laser 12. Accordingly, it may be possible (or even probable) that fluid media 36 that is passed onto or through workpiece 16, debris generated by cutting workpiece 16, or both may have a tendency to come into contact with linear motor 18 and/or rotary motor 20. Because of the level of precision required by motors 18/20 and because of the probably that fluid 36 and/or cutting debris may become disposed on these motors 18/20, regular maintenance and cleaning of motors 18/20 may be required in order to achieve optimal performance. This is because fluid media 36 and debris may be corrosive or otherwise damaging to the sensitive motors 18/20 (which may include electrical mechanisms, bearings, and the like). It can be appreciated that this maintenance can be costly and time consuming. In addition, the maintenance procedures themselves may damage these precise motors 18/20 or otherwise decrease the expected life of these motors 18/20.

In order to overcome some of these maintenance and other issues, a number of alternative stent cutting devices and procedures have been developed. One such alternative device was disclosed in U.S. patent application Ser. No. 10/190,975, the entire disclosure of which is hereby incorporated by reference. This stent cutting device utilizes a vertical orientation where the laser, motors, and workpiece are arranged vertically.

Figure 2:
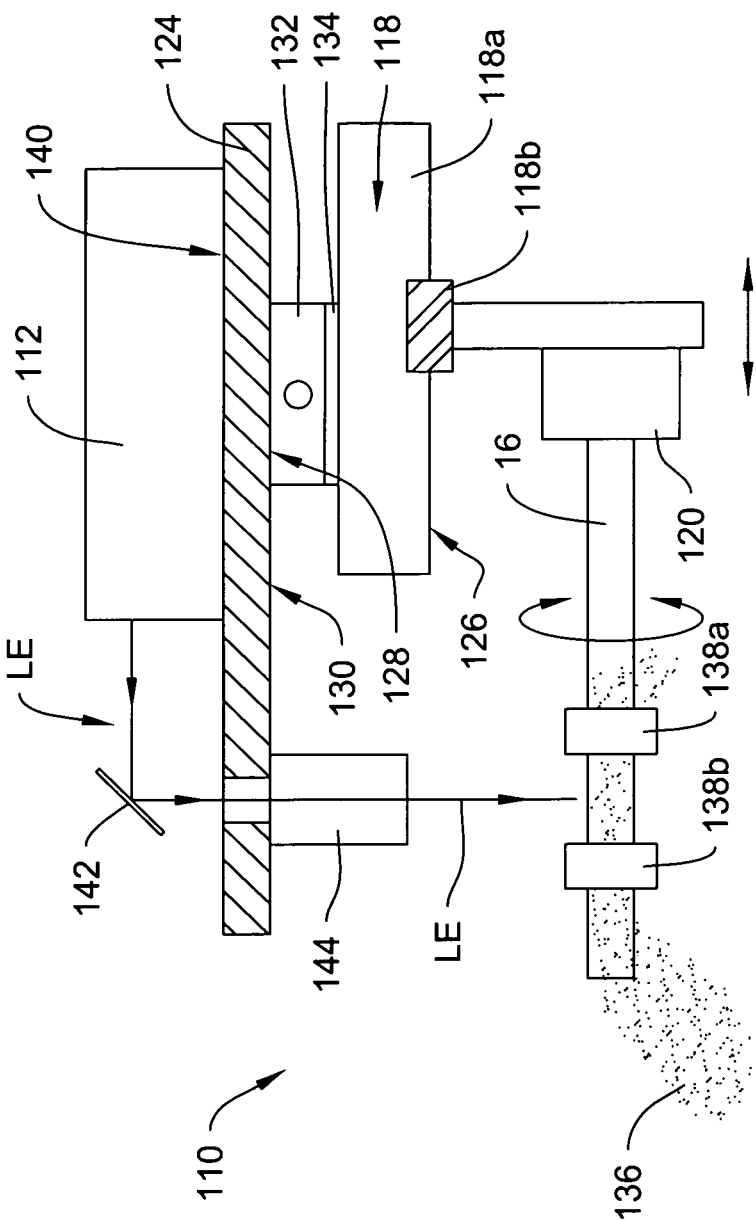
FIG. 2 is a side view of another example stent cutting device.

Another alternative stent cutting device 110 is shown in FIG. 2. It should be noted that although cutting device 110 is described as being used for cutting stents, this is not intended to be limiting. For example, cutting device 110 can be used to cut or otherwise manufacture other devices such as snares, strain reliefs, guidewire and catheter components, intravascular filtering devices (including embolic protection and vena cava filters), and the like, or any other suitable device.

Cutting device 110 utilizes a configuration where linear motor 118 and/or rotary motor 120 (which are typically similar to motors 18/20) are attached to a common base 124 along with a laser or other cutting means 112. Workpiece 16 is coupled to rotary motor 120 and generally positioned below laser 112, linear motor 118, and rotary motor 120. Accordingly, gravity will tend to pull fluid and debris spray 136 downward and away from motors 118/120. This will tend to reduce the maintenance required to sustain the precision required by motors 118/120. Moreover, a number of wires or other connections (not shown) between the various components may also be positioned near motors 118/120 and away from fluid and debris spray 136. Thus, other components of cutting device 110 may be protected by this configuration.

It can also be seen in FIG. 2 that linear motor 118 is mounted onto or otherwise coupled to common base 124 in a manner that can be described as being "up-side down". This is because the surface of linear motor 118 that is generally considered to be its top surface 126 is pointed downward or generally oriented in the downward direction. The bottom surface 128 of linear motor 118 is pointed up or otherwise oriented in the upward direction. Moreover, bottom surface 128 of linear motor 118 is coupled to a downward facing surface 130 of common base 124. Collectively, the arrangement or spatial relationship of linear motor 118 and common base 124 define the up-side down configuration of linear motor 118. The up-side down configuration is different from the typical "right-side up" arrangement utilized in typical stent cutting devices, for example, like cutting device 10. Additionally, because rotary motor 120 is attached or otherwise coupled to linear motor 118, rotary motor 120 can also be seen to be in an up-side down configuration. It should be noted that switching the position of linear motor 118 and rotary motor 120 (i.e., so that rotary motor 120 is attached to common base 124 and linear motor is coupled to rotary motor 120) is also contemplated so that some embodiments utilize this alternative configuration. For example, linear motor 118 and/or rotary motor 120 may be attached to any region of base 124 including along the legs 148a/b (best seen in FIG. 3) of base 124.

In addition to having gravity aid in keeping fluid and other debris 136 away from the various components of cutting device 110, being in the up-side down configuration and having motors 118/120 and laser 112 coupled to a singular common base 124 may provide cutting device 110 with a number of other desirable characteristics. For example, having the motion components (e.g., motors 118/120) and the optical or cutting components (e.g., laser 112) connected through common base 124 rather than a set of bases or frames can reduce the relative motion that can be caused by vibration, inertial forces, and thermal expansion (i.e., differing amounts of thermal expansion attributed to differing materials). Thus, the relative displacement of the various components relative to one another can be reduced. This can aid in the ability to maintain the precision utilized in a stent cutting procedure.

In addition, the up-side down configuration and the use of common base 124 may also improve the layout of the various components of cutting device 110 so that it may be easier to access, service, clean, and maintain device 110. Moreover, common base 124 may be spread out or "open". Because of the "openness" of common base 124 and/or the up-side down configuration, which can be seen in FIG. 3, device 110 may be generally more functionally oriented so that automated part handling can be incorporated easier into cutting device 110. For example, the configuration of cutting device 110 improves fluid collection and debris reclamation. This feature may be important when workpiece 16 includes platinum or another material that would be desirable to recollect. In addition, cutting device 110 is set up for the incorporation of additional components and automated versions of the currently utilized components.

Some of the additional components that may be used with cutting device 110 may include a interface plate 134 and/or a manually adjustable alignment stage 132 that may be disposed adjacent linear motor 118. Stage 132 may be of the dovetail slide type (available from Gilman Manufacturing) or may be or include a controlled motor. In some embodiments, interface plate 134 and/or stage 132 are integral components of linear motor 118 and may serve as the bottom surface 128 of linear motor 118 itself. Alternatively, interface plate 134 and/or stage 132 may be positioned laterally or in any other suitable location relative to linear motor 118 so that bottom surface 128 of linear motor 118 can be attached to common base 124. The exact form of interface plate 134 and stage 132 may vary. For example, stage 132 could alternatively be a linear motor. Linear motor 118 may also include a base portion 118a and a carriage portion 118b. Base portion 118a, generally, remains stationary. Carriage portion 118b may be slidable along base portion 118a. Other components may include a fluid and debris recapture device (not shown) that may be positioned below workpiece 16 and that can be used to collect fluid and debris spray that may be generated during the cutting procedure. This recapture device may be used for selective material removal.

As described above, it may be desirable to spray a fluid (indicated in part by reference number 136) onto and/or through workpiece 16 during the cutting procedure. The source of the fluid spray may include a nozzle (not shown) positioned adjacent workpiece 16 that is configured to spray the fluid 136 onto or through workpiece 16. According to this embodiment, the nozzle may be attached to rotary motor 120, common base 124, another peripheral base member, or at any other suitable location. Alternatively, the fluid source may piped in through the tubular workpiece 16 by connecting a fluid conduit to workpiece 16 or simply passing fluid 136 into workpiece 16 by directly connecting workpiece to a fluid source. It can be appreciated that a number of differing fluid sources may be utilized without departing from the spirit of the invention.

Fluid 136 may serve a number of purposes during the cutting procedure. For example, fluid 136 may be useful for washing away debris that is generated during the cutting procedure. In addition, fluid 136 may also be used for cooling any heat that might be generated during the cutting procedure. In some embodiments, fluid 136 may also act as a lubricant, oxidizer, cleaner, polishing agent, pretreatment, and the like, or any other suitable purpose. Accordingly, fluid 136 may comprise a number of different materials. For example, fluid 136 may be water. Alternatively, fluid 136 may be PRIMECUT™, CITRISURF™ (available from Stellar Sollutions), other fluids, a gas, combinations thereof, or any other suitable material.

One or more guides or bushings 138a/b may be connected to or otherwise coupled to base 124. Guides 138a/b may be another base or any other component of cutting device 110. Generally, guides 138a/b can be used to assist in the holding and maintaining the position of workpiece 16 relative to laser 112 and the other components of cutting device 110. In some embodiments, workpiece 16 may be longitudinally movable (via linear motor 118) between pre-cut guide 138a and post-cut guide 138b. By utilizing both a pre-cut guide 138a and a post-cut guide 138b, the precise position of workpiece 16 can be improved, which can improve the overall precision of the cutting procedure. Guides 138a/b may also be attached to a number of other portions of cutting device 110 such as base portion 118a of linear motor 118, interface plate 134, or other (generally stationary) components of device 110.

Figure 3:
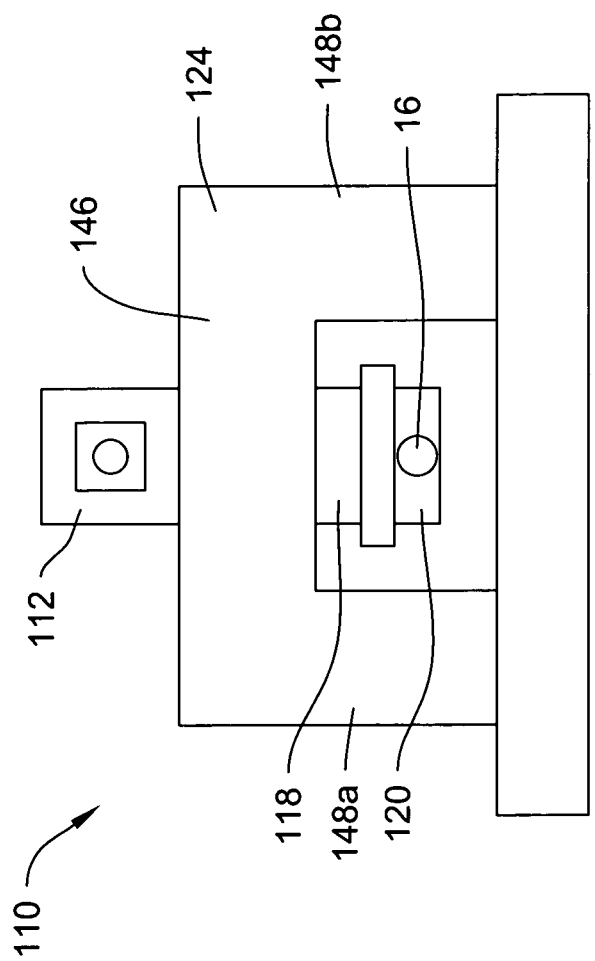
FIG. 3 is a front view of the stent cutting device shown in FIG. 2.

Common base 124 may be generally made from a relatively massive or otherwise solid material. One example material that may be utilized for common base 124 may be granite or another igneous rock. Alternatively, common base 124 may be made from or otherwise include a metal or metal alloy, a cast polymer, a structural metal, a filled structural metal, and the like, or any other suitable material. Common base 124 may be a singular piece of any other these materials or it may be made from multiple pieces that are attached together. Common base 124 may be arranged in an up-side down "U" shape or otherwise have a horizontal component 146 and two vertical legs 148*a/b* as shown in FIG. 3. This arrangement may provide cutting device 110 with the "openness" that may be desirable for some of the reasons stated above. Common base 124, however, is not intended to be limited to this particular shape as any suitable shape may be used. For example, common base 124 may include only one vertical leg 148*a* so as to have an up-side down "L" shape.

The motors 118/120 used in cutting device 110 may generally include motors capable of repetitively producing the required level of precision, accuracy, and repeatability for stent cutting procedures. Linear motor 118 may generally include a longitudinally moveable shaft and mechanical means for moving the shaft. Longitudinal movement is indicated in FIG. 2 by the left/right arrow. Examples of suitable linear motors 118 are the ALS Series motors, which are commercially available from Aerotech. Rotary motor 120 may generally include a rotary shaft and mechanical means for moving the shaft. Rotary movement is indicated in FIG. 2 by the rotary arrow. Examples of suitable rotary motors 120 are the ASR or ADRT Series motors, which are commercially available from Aerotech.

As suggested above, the cutting means 112 may generally include a laser. Laser 112 is mounted or otherwise attached to common base 124. The position of laser 112 on base 124 may vary. For example, laser 112 may be mounted onto a top or upward facing surface 140 of common base 124. However, this need not be the case for all embodiments as laser 112 can be attached at essentially any suitable location along base 112. In some embodiments, laser 112 is configured to transmit laser energy LE downward onto workpiece 16. This may be accomplished by disposing laser 112 directly over workpiece 16 so that laser energy LE can be directly transmitted onto workpiece 16. Alternatively, laser 112 may transmit laser energy LE in a different direction (e.g., laterally) and then the laser energy LE can be reflected or otherwise directed onto workpiece 16 by one or more tuning mirrors 142 and through a beam delivery or manipulating structure 144. The direction of the laser energy LE is indicated by arrows. It can be appreciated that a number of different configurations may be utilized without departing from the spirit of the invention.

Laser 112 may generally comprise any one of a number of known lasers such as YAG, diode, IR, UV, $CO_2$, and the like, or any other suitable laser or laser-like device. Alternatively, laser 112 may comprise a hybrid laser/water jet. An example of such a laser/water jet hybrid is commercially available from SYNOVA Inc., of Lausanne, Switzerland and is described in PCT Publication No. WO 9532834 entitled Device For Machining Material With A Laser and the corresponding U.S. Pat. No. 5,902,499, the entire disclosures of which are herein incorporated by reference.

Workpiece 16 may generally be a tubular structure that, when cut by cutting device 110, can form a stent or other medical device. It should be noted that although the focus of this description has been centered on forming intravascular stents, this is not intended to be limiting as other devices may be formed using the described devices and procedures. For example, cutting device 110 may be used to form grafts, stent-grafts, filters, cut or notched tubes for catheters and other similar devices, other devices for use within the body, and the like, or any other suitable device. Moreover, workpiece 16 need not be tubular. For example, workpiece 16 could be planar or form any suitable three-dimensional structure.

Workpiece 16 may vary in size (i.e., length, outer diameter, thickness, etc.), shape, and material composition. For example, workpiece 16 may be made from any suitable materials such as metals, metal alloys, polymers, metal-polymer composites, and the like. Some examples of metals and metal alloys that may be used include stainless steel, such as 304V, 304L, and 316LV stainless steel; mild steel; nickel-titanium alloy such as linear-elastic or super-elastic nitinol, nickel-chromium alloy, nickel-chromium-iron alloy, cobalt alloy, tungsten or tungsten alloys, MP35-N (having a composition of about 35% Ni, 35% Co, 20% Cr, 9.75% Mo, a maximum 1% Fe, a maximum 1% Ti, a maximum 0.25% C, a maximum 0.15% Mn, and a maximum 0.15% Si), hastelloy, monel 400, inconel 825, or the like; other Co—Cr alloys; platinum enriched stainless steel; or other suitable material. In embodiments where the resultant medical device is a stent, it may be desirable for workpiece 16 to be made from or otherwise include a radiopaque material. Radiopaque materials are understood to be materials capable of producing a relatively bright image on a fluoroscopy screen or another imaging technique during a medical procedure. This relatively bright image aids the user of the medical device in determining its location. Some examples of radiopaque materials can include, but are not limited to, gold, platinum, palladium, tantalum, tungsten alloy, plastic material loaded with a radiopaque filler, and the like.

Some examples of suitable polymers may include polytetrafluoroethylene (PTFE), ethylene tetrafluoroethylene (ETFE), fluorinated ethylene propylene (FEP), polyoxymethylene (POM), polybutylene terephthalate (PBT), polyether block ester, polyurethane, polypropylene (PP), polyvinylchloride (PVC), polyether-ester (for example a polyether-ester elastomer such as ARNITEL® available from DSM Engineering Plastics), polyester (for example a polyester elastomer such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), silicones, polyethylene (PE), Marlex high-density polyethylene, Marlex low-density polyethylene, linear low density polyethylene (for example REXELL®), polyethylene terephthalate (PET), polyetheretherketone (PEEK), polyimide (PI), polyetherimide (PEI), polyphenylene sulfide (PPS), polyphenylene oxide (PPO), polysulfone, nylon, perfluoro(propyl vinyl ether) (PFA), other suitable materials, or mixtures, combinations, copolymers thereof, polymer/metal composites, and the like. In some embodiments workpiece 16 can be blended with a liquid crystal polymer (LCP). For example, the mixture can contain up to about 5% LCP. In some embodiments, a coating, for example a lubricious, a hydrophilic, a protective, pharmacological, or other type of coating may be applied over portions or all of workpiece 16, or other portions of workpiece 16.

The cutting procedure may include connecting workpiece 16 to cutting device 110 (i.e., connecting workpiece 16 to rotary motor 120, guides 138, or any other component of cutting device 110), orienting workpiece 16 under laser 112, and directing laser energy LE onto workpiece 16. Linear and rotary motors 118/120 can be used to longitudinally move and rotate workpiece 16 during the cutting process so that laser 112 can cut and impart the desired cutting pattern onto workpiece 16. Additionally, fluid 136 may be sprayed onto and/or through workpiece 16 to wash away debris or serve the other purposes described above. Once the desired cutting pattern has been imparted, the newly formed device can be separated from workpiece 16 (that is, if the newly formed device is to be smaller or shorter than workpiece 16) by simply cutting off the newly formed device with laser 112 or any other suitable cutting means.

It should be understood that this disclosure is, in many respects, only illustrative. Changes may be made in details, particularly in matters of shape, size, and arrangement of steps without exceeding the scope of the invention. The invention's scope is, of course, defined in the language in which the appended claims are expressed.

What is claimed is:

1. A device for manufacturing an intravascular stent, comprising:
   a base having a first surface and a second surface;
   a laser cutting system attached to the first surface of the base, wherein the laser cutting system includes a laser/water jet hybrid;
   a linear motor attached to the second surface of the base;
   a rotary motor coupled to the linear motor, wherein the rotary motor is positioned below the linear motor;
   a workpiece coupled to the rotary motor, the workpiece positioned below the linear motor;
   a pre-cut guide coupled to the workpiece; and
   a post-cut guide coupled to the workpiece.

2. The device of claim 1, further comprising a fluid that is passed onto or through the workpiece.

3. The device of claim 1, wherein the base includes granite.

4. The device of claim 1, wherein the linear motor is configured to move the workpiece horizontally.

5. The device of claim 1, wherein the linear motor is upside-down.

6. The device of claim 1, wherein the laser cutting system is configured to transmit laser energy in the horizontal direction.

7. The device of claim 6, further comprising a tuning mirror that reflects the horizontally transmitted laser energy from the horizontal direction to the vertical direction.

8. A device for cutting a stent from a tube, comprising:
   a base member having a top surface and a bottom surface;
   a first motor having a top surface and a bottom surface, the bottom surface of the first motor being attached to the bottom surface of the base member, such that the first motor is attached upside-down to the base member;
   a laser cutting device attached to the top surface of the base member, wherein the laser cutting system includes a laser/water jet hybrid;
   a rotary motor attached to the first motor, wherein the rotary motor is positioned below the first motor; and
   a tubular workpiece connected to the rotary motor;
   wherein the tubular workpiece is positioned below the first motor.

9. The device of claim 8, further comprising one or more guides coupled to the base member.

10. The device of claim 8, further comprising one or more guides coupled to a base portion of the first motor.

11. The device of claim 8, further comprising one or more guides coupled to an interface plate of the first motor.

12. The device of claim 8, further comprising a fluid that is passed onto or through the workpiece.

13. The device of claim 8, wherein the base member includes granite.

14. The device of claim 8, wherein the first motor is configured to move a workpiece horizontally.

* * * * *